J. DRUMB.
BUMPER FOR AUTOMOBILES.
APPLICATION FILED SEPT. 18, 1920.
1,377,815.  Patented May 10, 1921.
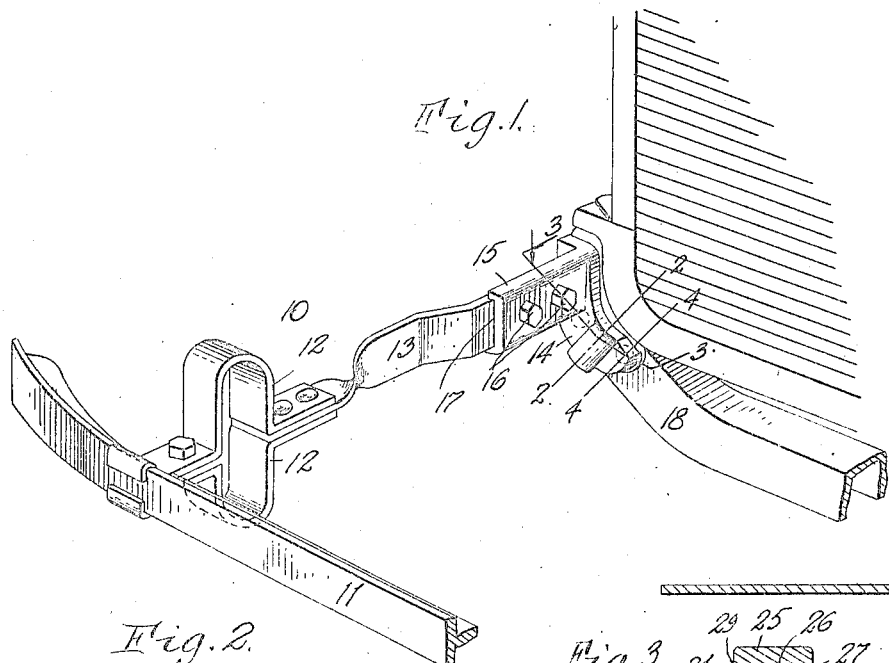
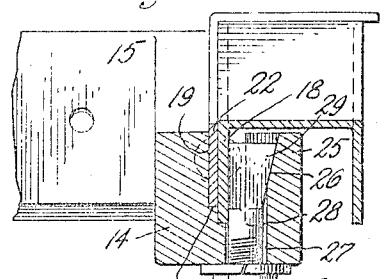
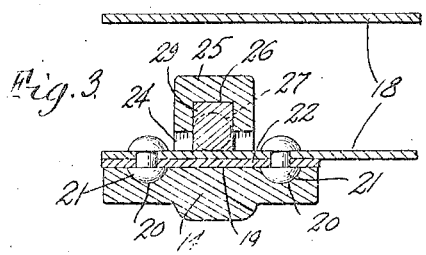
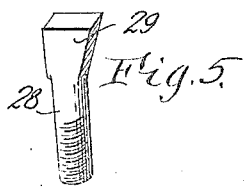
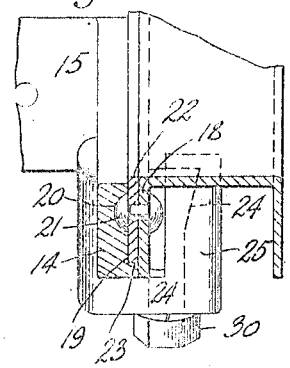
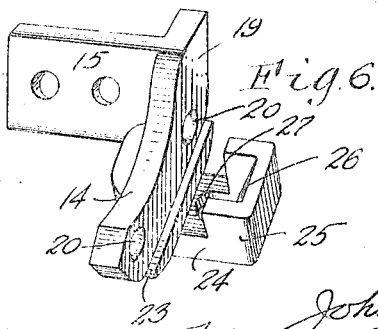
Inventor.
John Drumb
by Parker Prochum
Attorneys.

UNITED STATES PATENT OFFICE.

JOHN DRUMB, OF BUFFALO, NEW YORK, ASSIGNOR TO McKINNON DASH COMPANY, OF BUFFALO, NEW YORK.

BUMPER FOR AUTOMOBILES.

1,377,815.

Specification of Letters Patent.

Patented May 10, 1921.

Application filed September 18, 1920. Serial No. 411,196.

*To all whom it may concern:*

Be it known that I, JOHN DRUMB, a citizen of the United States, residing at Buffalo, in the county of Erie and State of New York, have invented a new and useful Improvement in Bumpers for Automobiles, of which the following is a specification.

This invention relates to bumpers for automobiles, and more particularly to means for securing a bumper to the frame of an automobile.

The objects of the invention are to provide means of improved construction for mounting a bumper on the frame of an automobile in such a manner that the bumper can be readily mounted on the automobile or removed therefrom; also to provide an attaching device for securing the bumper to a transverse frame member of an automobile; also to improve the construction of attaching means of this kind in other respects hereinafter specified.

The attaching device is shown in the accompanying drawings as applied to the front transverse frame member of a "Ford" automobile, while the attaching device is primarily intended to be used in connection with "Ford" automobiles, yet it is not intended to limit the invention to such use.

In the accompanying drawings:—

Figure 1 is a fragmentary perspective view of an automobile frame and a bumper and the improved attaching means embodying the invention.

Fig. 2 is a sectional elevation thereof on line 2—2, Fig. 1.

Fig. 3 is a sectional plan thereof on line 3—3 Fig. 1.

Fig. 4 is a sectional elevation thereof on line 4—4, Fig. 1.

Fig. 5 is a perspective view of the wedge bolt thereof.

Fig. 6 is a perspective view of the attaching bracket thereof.

Referring to the drawings:—

10 designates a bumper which may be of any suitable construction. In the embodiment illustrated the bumper comprises a bumper bar 11, each side of which is clamped between a pair of spring members 12, supported by a rearwardly extending arm 13. Only one side of the bumper and vehicle frame is shown, it being understood that similar supporting means are provided for the other side of the bumper.

The bumper bar and spring supporting means may be of any suitable type, the only requirement being that the bumper have rearwardly projecting arms for attachment to the bracket.

According to the invention, the attaching means for securing the bumper to the automobile include a bracket member which consists of a plate member 14, having an arm 15 extending therefrom on which the arm 13 of the bumper may be seated and to which it is attached by suitable means, such as bolts 16. The arm 15 may, if desired, extend outwardly from the plate member 14 at an angle thereto, as shown in the drawings. The outer face of the angular arm 15 is preferably grooved as at 17 so that the arm 13 will fit snugly therein. The plate member 14 is preferably shaped to conform to the shape of a channel member 18 of the frame and is formed with a flat inner face 19. When it is desired to secure the bumper attaching means to the Ford automobile, the flat inner face is preferably provided with recesses 20 therein to receive the usual rivet heads 21 projecting from the overlapping end piece 22 of the channel, and the inner face 19 of the plate member is also provided with a longitudinal shoulder or rib 23 on which the lower edge of the end piece 22 rests. A bridging portion 24 extends from beneath the plate member 14 and this bridging portion carries a guide member or stationary wedge portion 25 which is adapted to be positioned between the flanges of the channel beam, the lower edge of the channel flange 18 resting upon the bridging portion 24 in which position the parts straddle the lower edge of the flange 18. The fixed guide member or wedge portion 25 is formed with an inclined or wedge face 26 which communicates with a hole 27 through the bridging portion 24.

The bracket is secured in place on the channel beam by means of a wedge bolt 28 provided with a threaded shank extending through the hole in the bridging member and a flaring or tapered head 29 providing a wedging face. The bolt is provided with a nut 30 and upon turning the nut upon the bolt the bolt will be moved downwardly, the wedge face on the bolt coöperating with the inclined or fixed wedge face 26 to wedge the bolt tightly against the inner side of the channel flange 18 and to draw the face 19 of the plate member 14 tightly against the end piece 22 of the frame. In such position, the rivet heads 21 which project into recesses 20, together with the wedging action of the bolt will effectively prevent movement of the bracket relatively to the channel.

To secure the bracket to the frame channel, the bolt is placed in its guide part and the shank of the bolt held from projecting from the hole 27. The bracket is then placed upon the flange 18 of the channel, with the face 19 in contact with the overlapping end piece 22 and the rivet heads 21 in the recesses 20. The bolt is then allowed to drop down and the nut is secured on its projecting end. Tightening of the nut will wedge the parts together as aforesaid. While the bracket is most securely held against detachment from the frame channel, it may be readily and easily removed by loosening the nut 30 whereupon the bolt may be forced upward, the head sliding up its slideway until it ceases to contact with the flange member 18, whereupon the bracket may be withdrawn from the flange.

I claim as my invention:—

1. In combination with a frame channel of an automobile, an attaching member comprising a part adapted to enter between the flanges of said channel and a part engaging the outer side of one of said channel flanges, and a member having a seating in said first member and bearing upon the inner side of said channel flange for wedging said second part against said channel flange.

2. In a device for attaching a bumper to a vehicle frame member having a flange, the combination of two parts movable relatively to each other, one of said parts straddling said flange and engaging one side thereof and the other part contacting with the other side of said flange, coöperating inclined faces on said two parts, whereby movement of said two parts relatively to each other causes said parts to be wedged tightly against opposite sides of said channel flange, and an arm on one of said parts to which said bumper may be attached.

3. In a device for attaching a bumper to a vehicle frame member having a flange, the combination of a member adapted to straddle said flange and to engage one side thereof, a taper headed bolt coöperating with said member and adapted to be wedged between said member and the opposite side of said flange, and an arm extending from said member and to which said bumper may be attached.

4. In a bracket for attachment to a vehicle frame channel having rivet heads projecting from one of its side flanges, the combination of a plate member formed with recesses in its face for receiving said projecting rivet heads, and a second member for wedging said plate member against said side flange, whereby said plate member is securely held against movement thereon.

5. In a bracket for attachment of a bumper to a frame channel having rivet heads projecting from one of its side flanges, the combination of a plate member provided with recesses in its face for receiving said projecting rivet heads, an arm projecting from said plate member to which a bumper may be secured, and a second member coöperating with said plate member to wedge said plate member against said side flange.

6. In a bracket for attachment to a frame channel having rivet heads projecting from one of its side flanges, the combination of a plate member having a face for contacting with said side flange of said channel, and a wedging member having a stationary part and a member movable relatively thereto for drawing said plate member against said channel flange.

7. In a bracket for attaching a bumper to a vehicle frame channel having rivet heads projecting from one of its side flanges, the combination of a plate member having a face for contacting with said side flange of said channel and having recesses in its face for receiving said projecting rivet heads, means for drawing said plate member against said channel flange, and an arm projecting from said plate member to which said bumper may be attached.

8. In combination with a channel beam, a plate member for contacting with a side of one of the flanges of said beam, a part extending from said plate member beneath the edge of said flange and having a part extending along a portion of the other side of said flange and spaced therefrom, and a longitudinally movable member having a seating in said last named part, said last named member having an inclined face contacting with said extending part whereby upon lengthwise movement said member will be pressed laterally against said flange and secure said plate member thereto.

9. In combination with a channel beam having a side flange provided with an overlapping portion, a plate member having an inner face for contacting with said side flange, said inner face being formed with a longitudinal shoulder thereon and on which the lower edge of the overlapping portion is adapted to seat, a part extending from said plate member and providing a seat for the lower edge of said flange, a slideway forming part extending upwardly from said last named part, and a member movable in said slideway to wedge said plate member against said flange and said flange upon said seat.

10. In combination with a channel of a vehicle frame, a bracket member comprising a plate having a face for contacting with the face of one of the side flanges of said channel, a bridging portion projecting from said plate and adapted to rest on the lower edge of said flange, said bridging member having a hole therethrough, a stationary wedge member on the inner end of said bridging portion and adapted to project upwardly behind said channel flange, said stationary wedge member having an inclined wedge face therein, and a bolt projecting and movable through the hole in said bridging portion, said bolt having an inclined wedging portion coöperating with said inclined wedge face to force said bolt laterally against the inner side of said flange when the bolt is moved lengthwise through the hole in said bridging portion.

11. In combination with a vehicle frame channel having a strip riveted to the face of one of its side flanges, a bracket member comprising a plate provided with a face having recesses for receiving the projecting rivet heads on said strip and a longitudinal shoulder for engaging the lower edge of said strip, a bridging portion projecting from said plate member across said flange, said bridging portion having a hole therethrough, a guide member on the inner end of said bridging portion and adapted to project upward behind said channel flange, a wedging face on said guide member, a bolt projecting and movable lengthwise through the hole in said bridging portion, a nut on the projecting end of said bolt and bearing upon the underside of said bridging portion, and a wedge head on said bolt and resting on said wedging face of the guide member, whereby when said nut is tightened said bolt is moved lengthwise through said bridging member and moved laterally and wedged against the inner side of said flange.

Witness my hand this 17th day of September, 1920.

JOHN DRUMB.

Witnesses:
W. D. NOTMAN,
WALLACE CORMACK.